Dec. 4, 1956 P. S. SUSSENBACH 2,772,903
SEALING MEMBER
Filed Jan. 17, 1951

Paul S. Sussenbach,
Inventor,
Koenig and Pope,
Attorneys.

United States Patent Office 2,772,903
Patented Dec. 4, 1956

2,772,903

SEALING MEMBER

Paul S. Sussenbach, Brentwood, Mo., assignor, by mesne assignments, to American-Marietta Company, Chicago, Ill., a corporation of Illinois Application January 17, 1951, Serial No. 206,358

1 Claim. (Cl. 288—20)

This invention relates to sealing members, and more particularly to a member for sealing around a threaded bolt or the like extending through openings in bodies to be fastened.

In securing together two plates or other members by means of a fastener, such as a bolt, it is frequently desirable to seal the opening through which the fastener extends as a preservative against leakage and corrosion. This invention provides for internal sealing of such openings in a novel way. Briefly, the sealing member of the invention is a relatively thick apertured member or washer formed of soft, tacky, cold-flow, extrudable sealing material of a composition to be hereinafter specified. The plasticity of the sealing member is such that it will maintain its washer-like shape under normal conditions of handling, but under pressure will cold-flow with permanent deformation. The devices which are to be fastened with the aid of the washer are preferably composed of one held member having a relatively small opening adjacent the head of a bolt or the like which is to act as a fastener. The other held member has a relatively larger opening over which the thick washer is placed, and the soft washer preferably snugly fits the bolt. Between the soft washer and the nut is a metal washer on the bolt which is larger in diameter than the soft washer. When the nut is screwed down, it forces the large metal washer against the smaller, thicker, cold-flow washer, tending to force it first into said larger opening to in-fill the space around the bolt. The thickness of the soft washer supplies sufficient extrudable material for the above purpose and for flow out to the edge of the metal washer as a flashing to indicate a good seal. The soft washer is of a consistency that the metal washer may be driven into metal-to-metal contact around the relatively larger opening, forcing its way through the material of the soft washer. Thus a permanently tight sealed joint is reliably obtained.

In the finished fastening, one held member and the metal washer are in interfacial contact, the openings in the held members being filled with sealing material which adheres to the bolt and surrounding parts. Around the fastening is the indicating flashing.

The material from which the sealing washer is formed has certain physical characteristics that are necessary to the above results. Broadly, the plasticity of the sealing material is approximately that which can be hand-molded. The cold-flow characteristic of the material permits extrusion of the material from between members forced into interfacial contact. The material is also tacky to facilitate adherence and sealing action. For convenient storage and handling before application, nonadhesive facings are provided on the washer-like sealing member which are of a nature to disappear during application. The material is also made impervious to air and moisture.

Thus among the objects of the invention are the provision of an economical and convenient washer member adapted for sealing an opening in a body through which extends a stem-like member; and the provision of a member of the class described which will result in a rigid rather than resilient fastening wherein the seal is substantially unaffected by the stresses on the fastener. Other objects will be in part apparent and in part pointed out hereinafter.

The invention accordingly comprises the products hereinafter described, the scope of the invention being indicated in the following claim.

In the accompanying drawings, in which several of various possible embodiments of the invention are illustrated, Fig. 1 is a top plan view of the washer of this invention, with a protective part partially peeled away;

Similar reference characters indicate corresponding parts throughout the several views of the drawings.

Figure 1:
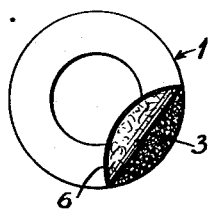
Figure 2:
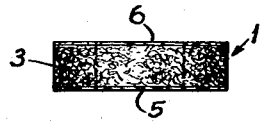
Fig. 2 is a side elevation of Fig. 1.

Referring now to the drawings, there is shown a sealing member 1 comprising a relatively thick washer formed of soft, tacky, extrudable sealing material 3 and provided with discrete nonadhesive faces 5 and 6 composed of a frangible parting material. For this purpose there may be used a thin porous material, such as fragile tissue paper; or the faces may be dusted with a thin film of talcum powder or the like. The sealing material 3 has a plasticity of an order permitting molding by hand, but is sufficiently stiff to maintain its washer-like shape under normal handling. Also, the material is relatively inelastic compared to vulcanized rubber. When subjected even to small stress, the sealing material cold flows with permanent deformation and adheres to surfaces which it engages. The use of this sealing member is described in connection with a bolt that fastens together a pair of plates, although the member may be used to seal around any stem-like elements extending through openings in any bodies to be fastened.

Figure 3:
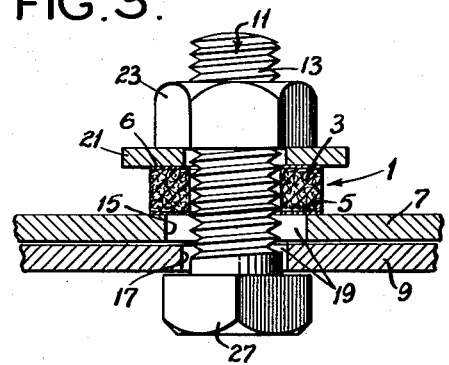
Fig. 3 is a cross section of a bolt to which the sealing member of the invention is applied and showing the first step in the method of using the sealing member.

Referring to Fig. 3, there is shown a body 7 in the form of a flat rigid metal plate, which is to be fastened to another plate 9 by means of a bolt 11. The bolt has a threaded stem 13 extending through and projecting from suitable openings 15 and 17 in the plates 7 and 9, respectively. Opening 15 is larger than opening 17. Between the stem 13 and plates 7 and 9 are voids 19. The sealing member 1 snugly fits the stem 13 of the bolt. One face 5 engages the plate 7. A flat apertured member 21, which may be a conventional rigid metal washer or fastener element, is applied to the stem 13 to surround the stem and engage the other face 6 of the sealing member. It is larger in diameter than opening 15. The inside diameter of a metal washer usually is 1/32 in. greater than the outside diameter of the bolt. It is desirable for the sealing member to have a close fit with the bolt, in order to facilitate sealing action, and the plastic property of the sealing member permits it to be fitted over the bolt even where the fit is close. In some instances, however, it is desirable for the sealing member 1 to have a loose fit with the bolt in order to facilitate fast assembly of the parts. It is important that the outside diameter of the metal washer 21 should be larger than the outside diameter of the sealing member 1, so that the former overlaps the latter. The thickness and outside diameter of the sealing member are primarily determined by the amount of sealing material required to fill voids between the stem 13 and plates 7 and 9. In a standardized set of sealing members, the inside diameter might vary in steps of 1/16 in., the outside diameter might be 3/8 in. greater than the inside diameter, and a choice of thicknesses of 1/16 in. or 1/8 in. might be provided.

Figure 4:
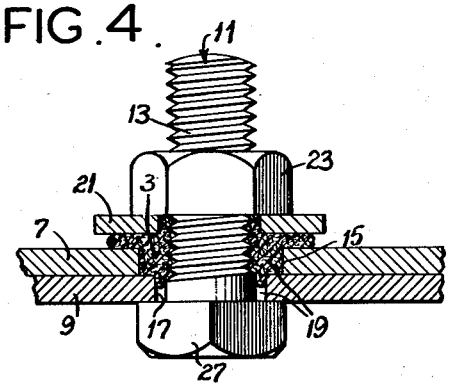
Fig. 4 is a view similar to Fig. 3, showing an intermediate step of the method.

Fig. 3 illustrates the assembly of parts with a threaded fastener element or nut 23 threaded lightly down upon the metal washer 21. As the nut is screwed down further, the plate 7 and metal washer 21 are forced together with squeezing effect upon the sealing member 1 therebetween. The material 3 of the sealing member is relatively incompressible as compared to its ready tendency to flow, hence a cold extrusion of the material 3 results (Fig. 4). The extrudable sealing material is forced from between members 7 and 21, and into the voids 19 around the stem 13 of the bolt. Much of the flow of sealing material is inward, because the portions of members 7 and 21 that overlap the sealing member offer initial resistance to outward flow of the sealing material.

Figure 5:
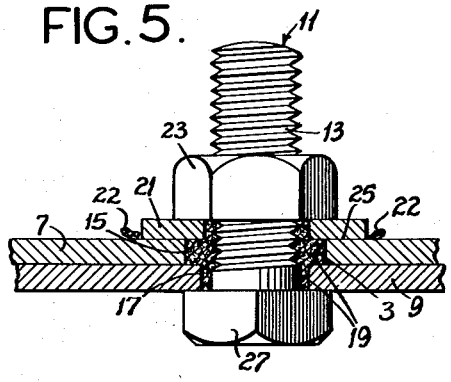
Fig. 5 is a view similar to Figs. 3 and 4, showing the final condition of the sealed fastener.
Figure 6:
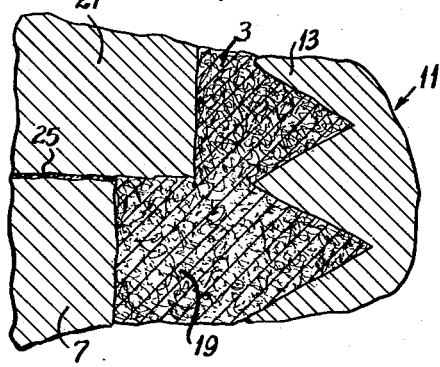
Fig. 6 is a fragmentary enlargement of certain parts shown in Fig. 5.

As shown in Figs. 5 and 6, the rigid metal washer 21 is finally forced into a metal-to-metal or interfacial engagement 25 with the rigid metal plate 7, and substantially all of the material 3 is forced from between these flat rigid members 7 and 21. This interfacial engagement of the members 7 and 21 permits a rigid fastening of the plates 7 and 9. The nut 23 may thus be tightened to provide as tight a fastening as would be possible without the sealing member. Ordinarily, the surfaces of members 7 and 21 will not be accurately flat and smooth, hence some sealing material may remain to fill the irregularities between these surfaces, while other substantial portions of the surfaces are in direct contact to provide a rigid fastening. It will be understood that the surface irregularities shown in Fig. 6 are merely intended to be those inherent in typical commercial structural members and fastener elements.

The sealing material 3 offers inappreciable resistance to threading down the nut, and the increase in torque required to thread down the nut over that required without a sealing member is slight, being of the order of four ounce-inches in a normal case.

The feature that the member 1 has substantial cold-flow characteristics without substantial resilience is important, since it allows the stated face-to-face contact between the washer and a member such as 7, besides the extrusive in-filling around the threads of the bolt 11. With ordinary sealing washers composed of resilient material such as rubber, a sealed and tight fastening may be obtained for some time, but ultimately it will deteriorate as the material loses its resiliency and takes a set. The ordinary result then is both leakage and a loose joint. By means of the present invention the material of the member 1 does not conttribute at all to the reactions which hold the joint tight, since it is squeezed out almost entirely from between the faces of 21 and 7. The entire holding reaction is thus due to the metal-to-metal contact between the members 21 and 7, and this reaction never deteriorates, whether or not the sealing material takes a set.

The head 27 of the bolt 11 and the nut 23 confine the flow of sealing material along the bolt, and thus determine the voids 19 into which the sealing material may flow. If the quantity of material 3 (determined by the dimensions of the sealing member) extruded inward is more than sufficient to fill the available voids, some compression of the sealing material in the void may occur at this point, provided the sealing material is compressible. If the material 3 is incompressible, then the excess material, initially tending to flow inward, is finally also extruded outward from beneath the metal washer 21 and forms a small lip portion 22 around the periphery of the washer. This lip acts as a signal that the joint is in-filled and that a proper size of sealing member is being used. Extrusion to a point beneath the nut 25 or beneath the head 27 of the bolt 11 is substantially prevented by the high frictional resistance presented to such flow.

In the extrusion process, the thin porous faces 5 and 6 on the sealing member are mashed and largely absorbed, so that the sealing material comes into direct contact with and adheres to the metal surfaces, with no intervening tissue. Thus, the soft, tacky extrudable sealing material not only fills the voids, but also adheres to the surfaces defining these voids.

Figure 7:
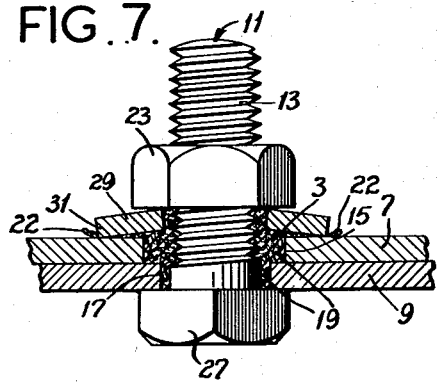
Fig. 7 is a view similar to Fig. 4, illustrating an alternative form of the invention.

Fig. 7 illustrates a metal washer 29 having a generally conical rather than flat shape. It is applied over the sealing member with the outer rim 31 thereof directed downward. The degree of deformation of the washer 29 from the flat shape need not be great, and may be that obtained inherently from stamping metal washers. The advantage of a conical-shaped washer is that flow of the sealing material 3 toward the center is better enforced. The flow of sealing compound for the Fig. 7 embodiment is otherwise the same as that described heretofore. Fig. 7 illustrates the conical washer 29 as only partially flattened out, although it will be understood that the washer is finally practically flattened in order to provide the most rigid fastening.

As pointed out above, the sealing material 3 of the sealing member 1 has certain physical characteristics. The material is impervious to air, dust and moisture in order to be an effective sealing medium, and is tacky so that it adheres to the members which are to be sealed. Also, the material is readily extruded in order to fill voids which are to be sealed, the elasticity of the material being sufficiently low to permit cold flow. A slight elasticity is not objectionable so long as it does not interfere with the primary extrusion properties of the material. Finally, the material should not deteriorate over very long periods.

A material from which sealing members of the present invention are formed is made of the following components:

| Component | Parts by weight |
|---|---|
| Elastomer—copolymer of butadiene and styrene containing 23.5% styrene (obtainable under the trade-name "GRS-25") | 8.4 |
| Tackifier and elastomer—polyisobutylene having an average molecular weight of approximately 11,000 (obtainable under the trade-name "Vistanex LMMS") | 8.4 |
| Plasticizer and extender—blown asphalt having an MP of 240 and an NP of 2.5 mm. (obtainable under the trade-name "#4 Korite") | 56.8 |
| Antioxidant—trimethyl dihydroxy quinoline (obtainable under the trade-name "Agerite Resin D") | 0.3 |
| Filler—carbon black of the semi-reinforcing furnace type (obtainable under the trade-name "Thermax") | 2.9 |
| Filler—pulverized tree bark, 28 mesh (obtainable under the trade-name "508 Silvacon") | 11.6 |
| Filler—pulverized tree bark, 100 mesh (obtainable under the trade-name "490 Silvacon") | 11.6 |

This material was tested for plasticity and consistency and according to the standard ASTM (American Society for Testing Materials) D5–49 test for bituminous materials it gave a needle penetration of 3.5 mm. at 77° F. The test differed from standard procedure only in that the material was packed into the test container instead of being poured in.

The proportions of the components in the above example may be varied considerably and the limits in percent by weight are as follows. Both the elastomer and the tackifier and elastomer may be varied between 5% to 40%. The plasticizer and extender may be varied between 0% to 60% and the antioxidant between 0% and 2%. The carbon black filler may be varied between 0% to 15% while the other two fillers may be varied between 5% to 30%. Also, any polyisobutylene having a molecular weight between 7000 to 15,000 is suitable.

The above material is formed into the described washer-like sealing members and the nonadhesive facings 5 adhered thereto. These facings may be of porous tissue paper, or of a similar nature, their principal purpose being to prevent several stacked sealing members from adhering to one another or to the hands of a user. But they must be of a nature such as to disintegrate under pressure, the resulting particles to be engulfed or surrounded by the plastic material during cold flow.

In conclusion, the invention features the provision of a sealing member in the shape of a relatively thick washer formed of soft flowable material which in use is placed over a bolt or the like and between a pair of relatively rigid apertured plates and compressed thereby to cause the sealing material to flow around the bolt and completely seal it within the apertured plates. It will be understood that metal washers such as shown in Figs. 3–6 need not be employed, but that the sealing member may be placed between two structural members, such as 9 and 11. Also, the fastener need not be a bolt but may be any other type of similar fastener, such as a screw, rivet or the like, the important feature being that the metal plates be brought into interfacial contact, with the sealing material substantially forced from between the plates so that the material does not carry the stress on the fastening required for keeping it tight.

Cross reference is made to my copending divisional application Serial No. 315,397, filed October 17, 1952, now U. S. Patent 2,718,691 issued September 27, 1955, entitled Method of Sealing, covering the sealing method disclosed herein.

In view of the above, it will be seen that the several objects of the invention are achieved and other advantageous results attained.

As various changes could be made in the above products without departing from the scope of the invention, it is intended that all matter contained in the above description or shown in the accompanying drawings shall be interpreted as illustrative and not in a limiting sense.

I claim:

A sealing member for use with a fastener such as a screw fastener, comprising a washer formed of a soft, tacky, extrudable sealing material having such plasticity that it maintains its shape under normal handling but which will cold-flow under pressure with permanent deformation, with the flow characteristic of the sealing material such as to permit cold extrusion thereof into voids around a fastener and from between metal parts that are forced together by the fastener, said sealing material consisting of approximately 8.4 parts by weight of a copolymer of butadiene and styrene containing 23.5% styrene, 8.4 parts by weight of polyisobutylene having an average molecular weight of approximately 11,000, 56.8 parts by weight of blown asphalt having an MP of 240 and an NP of 2.5 mm., 0.3 parts by weight of trimethyl dihydroxy quinoline, and 26.1 parts by weight of filler.

References Cited in the file of this patent
UNITED STATES PATENTS

| Number | Name | Date |
| --- | --- | --- |
| 1,056,010 | Dailey | Mar. 18, 1913 |
| 1,329,558 | Strauss | Feb. 3, 1920 |
| 1,339,599 | Garren | May 11, 1920 |
| 1,515,996 | Buchanan | Nov. 18, 1924 |
| 1,881,439 | Fischer | Oct. 11, 1932 |
| 1,942,489 | Pfferle | Jan. 9, 1934 |
| 2,119,280 | Kronquest et al. | May 31, 1938 |
| 2,140,672 | Gray et al. | Dec. 20, 1938 |
| 2,162,687 | Fischer | June 13, 1939 |
| 2,368,380 | Ruzicka | Jan. 30, 1945 |
| 2,382,245 | McCormack | Aug. 14, 1945 |
| 2,438,472 | Calcott | Mar. 23, 1948 |
| 2,535,869 | Schneider et al. | Dec. 30, 1950 |
| 2,639,832 | Bergstrom | May 26, 1953 |
| 2,697,873 | Cooke | Dec. 28, 1953 |

FOREIGN PATENTS

| | | |
| --- | --- | --- |
| 510,765 | Germany | Oct. 23, 1930 |

OTHER REFERENCES

Vanderbilt Rubber Handbook (1948), pages 194–205. (Copy Div. 50.)

Thiokol Facts, vol. 1, No. 5, received June 18, 1948, page 3. (Copy in Div. 50.)

Thiokol Facts, vol. 1, No. 15, received June 18, 1948, page 3. (Copy in Div. 50.)

Thiokol—Synthetic Rubber and Chemicals, received June 3, 1946, pages 8 and 9. (Copy in Div. 50.)